(12) United States Patent
Dinh et al.

(10) Patent No.: US 8,640,144 B2
(45) Date of Patent: Jan. 28, 2014

(54) METHOD FOR FACILITATING TRANSACTIONS BETWEEN THIN-CLIENTS AND MESSAGE FORMAT SERVICE (MFS)-BASED INFORMATION MANAGEMENT SYSTEM (IMS) APPLICATIONS

(75) Inventors: Thu-Tram T. Dinh, San Jose, CA (US); Shyh-Mei F. Ho, Cupertino, CA (US); Jenny ChengYin Hung, Fremont, CA (US); Kevin Yu Chang Yo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1122 days.

(21) Appl. No.: 12/169,486

(22) Filed: Jul. 8, 2008

(65) Prior Publication Data

US 2008/0271049 A1    Oct. 30, 2008

Related U.S. Application Data

(63) Continuation of application No. 11/083,507, filed on Mar. 18, 2005, now Pat. No. 7,421,701, and a continuation of application No. 10/244,722, filed on Sep. 16, 2002, now abandoned, and a continuation of application No. 10/244,711, filed on Nov. 27, 2002, now abandoned, and a continuation of application No. 10/440,779, filed on May 19, 2003, now Pat. No. 7,130,893.

(51) Int. Cl.
  *G06F 9/26* (2006.01)
(52) U.S. Cl.
  USPC ............................ 719/313; 709/203; 707/607
(58) Field of Classification Search
  None
  See application file for complete search history.

(56) References Cited

U.S. PATENT DOCUMENTS

| 4,509,851 A | 4/1985 | Ippolito et al. |
| 4,589,093 A | 5/1986 | Ippolito et al. |
| 4,689,739 A | 8/1987 | Federico et al. |

(Continued)

FOREIGN PATENT DOCUMENTS

| JP | 2001273177 | 10/2001 |
| WO | WO0167290 | 9/2001 |

OTHER PUBLICATIONS

Objects by Design, Inc. Transforming XMI to HTML, Dec. 1, 1999 pp. 1-10.*

(Continued)

*Primary Examiner* — H S Sough
*Assistant Examiner* — Syed Roni
(74) *Attorney, Agent, or Firm* — Kunzler Law Group, PC

(57) ABSTRACT

A method is disclosed for facilitating conversational and non-conversational transactions between thin-clients and MFS-based IMS applications. The method includes storing conversation attributes associated with a conversational transaction between a thin-client and an MFS-based IMS application, the conversation attributes comprising connection information and conversation-specific information. Next, one or more transaction messages from the thin-client are preprocessed based on a transaction message type. The stored conversation attributes are updated in response changes in the conversation attributes caused by the one or more transaction messages. Then, a conversation output message is formatted for the thin-client. The method may include a security module authenticating a user, a connection module establishing a connection with an MFS-based IMS application, a state module preserving and maintaining conversation attributes, and a control module processing a transaction message having one or more transaction message types.

12 Claims, 7 Drawing Sheets

(56) References Cited

U.S. PATENT DOCUMENTS

| | | | |
|---|---|---|---|
| 4,740,783 A | 4/1988 | Lawrence et al. | |
| 5,384,565 A | 1/1995 | Cannon | |
| 5,488,648 A | 1/1996 | Womble | |
| 5,745,685 A | 4/1998 | Kirchner et al. | |
| 5,754,772 A * | 5/1998 | Leaf | 709/203 |
| 5,761,656 A | 6/1998 | Ben-Schachar | |
| 5,781,739 A * | 7/1998 | Bach et al. | 709/227 |
| 5,870,549 A | 2/1999 | Bobo | |
| 5,899,975 A | 5/1999 | Nielsen | |
| 5,960,200 A | 9/1999 | Eager et al. | |
| 5,978,940 A | 11/1999 | Newman et al. | |
| 5,987,432 A | 11/1999 | Zusman et al. | |
| 5,996,001 A | 11/1999 | Quarles et al. | |
| 6,067,579 A | 5/2000 | Hardman et al. | |
| 6,097,688 A | 8/2000 | Ichimura et al. | |
| 6,108,673 A | 8/2000 | Brandt et al. | |
| 6,128,622 A | 10/2000 | Bach et al. | |
| 6,141,660 A | 10/2000 | Bach et al. | |
| 6,212,550 B1 | 4/2001 | Segur | |
| 6,243,737 B1 | 6/2001 | Flanagan et al. | |
| 6,250,309 B1 | 6/2001 | Krichen et al. | |
| 6,253,200 B1 | 6/2001 | Smedley et al. | |
| 6,256,676 B1 | 7/2001 | Taylor et al. | |
| 6,259,447 B1 | 7/2001 | Kanetake et al. | |
| 6,289,382 B1 | 9/2001 | Bowman-Amuah | |
| 6,397,253 B1 * | 5/2002 | Quinlan et al. | 709/227 |
| 6,401,136 B1 | 6/2002 | Britton et al. | |
| 6,446,110 B1 | 9/2002 | Lection et al. | |
| 6,453,343 B1 | 9/2002 | Housel et al. | |
| 6,507,856 B1 | 1/2003 | Chen et al. | |
| 6,507,857 B1 | 1/2003 | Yalcinalp | |
| 6,510,466 B1 | 1/2003 | Cox et al. | |
| 6,519,617 B1 | 2/2003 | Wanderski et al. | |
| 6,529,921 B1 | 3/2003 | Berkowitz et al. | |
| 6,530,078 B1 | 3/2003 | Shmid et al. | |
| 6,535,896 B2 | 3/2003 | Britton et al. | |
| 6,560,639 B1 | 5/2003 | Dan et al. | |
| 6,589,291 B1 | 7/2003 | Boag et al. | |
| 6,591,272 B1 | 7/2003 | Williams | |
| 6,601,071 B1 | 7/2003 | Bowker et al. | |
| 6,606,642 B2 | 8/2003 | Ambler et al. | |
| 6,613,098 B1 | 9/2003 | Sorge et al. | |
| 6,615,383 B1 | 9/2003 | Talluri et al. | |
| 6,643,825 B1 | 11/2003 | Li et al. | |
| 6,665,861 B1 | 12/2003 | Francis et al. | |
| 6,668,354 B1 | 12/2003 | Chen et al. | |
| 6,687,873 B1 | 2/2004 | Ballantyne et al. | |
| 6,697,849 B1 | 2/2004 | Carlson | |
| 6,728,685 B1 | 4/2004 | Ahluwalia | |
| 6,738,975 B1 | 5/2004 | Yee et al. | |
| 6,753,889 B1 | 6/2004 | Najmi | |
| 6,772,206 B1 | 8/2004 | Lowry et al. | |
| 6,775,680 B2 | 8/2004 | Ehrman et al. | |
| 6,799,299 B1 | 9/2004 | Li et al. | |
| 6,810,429 B1 * | 10/2004 | Walsh et al. | 709/246 |
| 6,816,883 B2 | 11/2004 | Baumeister et al. | |
| 6,826,696 B1 | 11/2004 | Chawla et al. | |
| 6,850,979 B1 | 2/2005 | Saulpaugh et al. | |
| 6,859,834 B1 | 2/2005 | Arora et al. | |
| 6,874,146 B1 | 3/2005 | Iyengar | |
| 6,889,360 B1 | 5/2005 | Ho et al. | |
| 6,901,403 B1 | 5/2005 | Bata et al. | |
| 6,901,430 B1 | 5/2005 | Smith | |
| 6,904,598 B2 | 6/2005 | Abileah et al. | |
| 6,907,564 B1 | 6/2005 | Burchhardt et al. | |
| 6,909,903 B2 | 6/2005 | Wang | |
| 6,910,216 B2 | 6/2005 | Abileah et al. | |
| 6,912,719 B2 | 6/2005 | Elderon et al. | |
| 6,915,523 B2 | 7/2005 | Dong et al. | |
| 6,948,117 B2 | 9/2005 | Van Eaton et al. | |
| 6,948,174 B2 | 9/2005 | Chiang et al. | |
| 6,952,717 B1 | 10/2005 | Monchilovich et al. | |
| 6,964,053 B2 | 11/2005 | Ho et al. | |
| 6,971,096 B1 | 11/2005 | Ankireddipally et al. | |
| 6,980,963 B1 | 12/2005 | Hanzek | |
| 6,980,993 B2 | 12/2005 | Horvitz et al. | |
| 7,000,238 B2 | 2/2006 | Nadler et al. | |
| 7,013,306 B1 | 3/2006 | Turba et al. | |
| 7,024,413 B2 | 4/2006 | Binding et al. | |
| 7,043,687 B2 | 5/2006 | Knauss et al. | |
| 7,051,032 B2 | 5/2006 | Chu-Carroll et al. | |
| 7,054,901 B2 | 5/2006 | Shafer | |
| 7,058,955 B2 | 6/2006 | Porkka | |
| 7,069,291 B2 | 6/2006 | Graves et al. | |
| 7,080,092 B2 | 7/2006 | Upton | |
| 7,107,285 B2 | 9/2006 | von Kaenel et al. | |
| 7,111,011 B2 | 9/2006 | Kobayashi et al. | |
| 7,120,645 B2 | 10/2006 | Manikutty et al. | |
| 7,120,702 B2 | 10/2006 | Huang et al. | |
| 7,124,299 B2 | 10/2006 | Dick et al. | |
| 7,130,893 B2 | 10/2006 | Chiang et al. | |
| 7,134,075 B2 | 11/2006 | Hind et al. | |
| 7,143,190 B2 | 11/2006 | Christensen et al. | |
| 7,152,205 B2 | 12/2006 | Day et al. | |
| 7,181,493 B2 | 2/2007 | English et al. | |
| 7,266,582 B2 | 9/2007 | Stelting | |
| 7,296,226 B2 | 11/2007 | Junkermann | |
| 7,296,229 B2 | 11/2007 | Berstis | |
| 7,398,221 B1 | 7/2008 | Bensoussan et al. | |
| 7,418,508 B2 | 8/2008 | Haller et al. | |
| 7,421,701 B2 | 9/2008 | Dinh et al. | |
| 7,590,987 B2 | 9/2009 | Behrendt et al. | |
| 2001/0014900 A1 | 8/2001 | Brauer et al. | |
| 2001/0016869 A1 | 8/2001 | Baumeister et al. | |
| 2001/0032232 A1 | 10/2001 | Zombek et al. | |
| 2001/0034791 A1 | 10/2001 | Clubb et al. | |
| 2001/0037358 A1 | 11/2001 | Clubb et al. | |
| 2001/0047311 A1 | 11/2001 | Singh | |
| 2002/0010716 A1 | 1/2002 | McCartney et al. | |
| 2002/0031101 A1 | 3/2002 | Petite et al. | |
| 2002/0035583 A1 | 3/2002 | Price et al. | |
| 2002/0038335 A1 | 3/2002 | Dong et al. | |
| 2002/0038336 A1 | 3/2002 | Abileah et al. | |
| 2002/0042849 A1 | 4/2002 | Ho et al. | |
| 2002/0046294 A1 | 4/2002 | Brodsky et al. | |
| 2002/0049815 A1 | 4/2002 | Dattatri | |
| 2002/0052968 A1 | 5/2002 | Bonefas et al. | |
| 2002/0056012 A1 | 5/2002 | Abileah et al. | |
| 2002/0059344 A1 | 5/2002 | Britton et al. | |
| 2002/0078010 A1 | 6/2002 | Ehrman et al. | |
| 2002/0078255 A1 | 6/2002 | Narayan | |
| 2002/0083099 A1 | 6/2002 | Knauss et al. | |
| 2002/0099735 A1 | 7/2002 | Schroeder et al. | |
| 2002/0100027 A1 | 7/2002 | Binding et al. | |
| 2002/0107915 A1 | 8/2002 | Ally et al. | |
| 2002/0111989 A1 | 8/2002 | Ambler et al. | |
| 2002/0116454 A1 | 8/2002 | Dyla et al. | |
| 2002/0133569 A1 | 9/2002 | Huang et al. | |
| 2002/0143820 A1 | 10/2002 | Van Eaton et al. | |
| 2002/0156930 A1 | 10/2002 | Velasquez | |
| 2002/0160745 A1 | 10/2002 | Wang | |
| 2002/0160805 A1 | 10/2002 | Laitinen et al. | |
| 2002/0161801 A1 | 10/2002 | Hind et al. | |
| 2002/0174340 A1 | 11/2002 | Dick et al. | |
| 2002/0178031 A1 | 11/2002 | Sorensen et al. | |
| 2002/0178290 A1 | 11/2002 | Coulthard et al. | |
| 2002/0178299 A1 | 11/2002 | Teubner | |
| 2002/0188688 A1 | 12/2002 | Bice et al. | |
| 2002/0194227 A1 | 12/2002 | Day et al. | |
| 2002/0198974 A1 | 12/2002 | Shafer | |
| 2003/0004746 A1 | 1/2003 | Kheirolomoom et al. | |
| 2003/0007397 A1 | 1/2003 | Kobayashi et al. | |
| 2003/0040955 A1 | 2/2003 | Anaya et al. | |
| 2003/0046035 A1 | 3/2003 | Anaya et al. | |
| 2003/0055768 A1 | 3/2003 | Anaya et al. | |
| 2003/0065623 A1 | 4/2003 | Corneil et al. | |
| 2003/0070006 A1 | 4/2003 | Nadler et al. | |
| 2003/0074217 A1 | 4/2003 | Beisiegel et al. | |
| 2003/0078902 A1 | 4/2003 | Leong et al. | |
| 2003/0081002 A1 | 5/2003 | De Vorchik et al. | |
| 2003/0093403 A1 | 5/2003 | Upton | |
| 2003/0093436 A1 | 5/2003 | Brown et al. | |
| 2003/0093468 A1 | 5/2003 | Gordon et al. | |
| 2003/0093500 A1 | 5/2003 | Khodabakchian et al. | |

(56) References Cited

U.S. PATENT DOCUMENTS

| | | |
|---|---|---|
| 2003/0097327 A1 | 5/2003 | Anaya et al. |
| 2003/0120730 A1 | 6/2003 | Kuno et al. |
| 2003/0126077 A1 | 7/2003 | Kantor et al. |
| 2003/0126229 A1 | 7/2003 | Kantor et al. |
| 2003/0131142 A1 | 7/2003 | Horvitz et al. |
| 2003/0159111 A1 | 8/2003 | Fry |
| 2003/0163544 A1 | 8/2003 | Wookey et al. |
| 2003/0163585 A1 | 8/2003 | Elderon et al. |
| 2003/0167233 A1 | 9/2003 | Smith |
| 2003/0191970 A1 | 10/2003 | Devine et al. |
| 2003/0204460 A1 | 10/2003 | Robinson et al. |
| 2003/0212686 A1 | 11/2003 | Chu-Carroll et al. |
| 2004/0006739 A1 | 1/2004 | Mulligan |
| 2004/0024820 A1 | 2/2004 | Ozzie et al. |
| 2004/0030740 A1 | 2/2004 | Stelting |
| 2004/0054969 A1 | 3/2004 | Chiang et al. |
| 2004/0054970 A1 | 3/2004 | Chiang et al. |
| 2004/0064466 A1 | 4/2004 | Manikutty et al. |
| 2004/0103370 A1 | 5/2004 | Chiang et al. |
| 2004/0111464 A1 | 6/2004 | Ho et al. |
| 2004/0205536 A1 | 10/2004 | Newman et al. |
| 2004/0205731 A1 | 10/2004 | Junkermann |
| 2004/0205770 A1 | 10/2004 | Zhang et al. |
| 2004/0210469 A1 | 10/2004 | Jones et al. |
| 2004/0221292 A1 | 11/2004 | Chiang |
| 2004/0230987 A1 | 11/2004 | Snover et al. |
| 2004/0237034 A1 | 11/2004 | Chiang et al. |
| 2005/0050228 A1 | 3/2005 | Perham et al. |
| 2005/0091639 A1 | 4/2005 | Patel |
| 2005/0165826 A1 | 7/2005 | Ho et al. |
| 2005/0165936 A1 | 7/2005 | Haller et al. |
| 2005/0166209 A1 | 7/2005 | Merrick et al. |
| 2005/0171970 A1 | 8/2005 | Ozzie et al. |
| 2005/0203944 A1 | 9/2005 | Dinh et al. |
| 2005/0210414 A1 | 9/2005 | Angiulo et al. |
| 2005/0278410 A1 | 12/2005 | Espino |
| 2006/0265478 A1 | 11/2006 | Chiang et al. |
| 2007/0083524 A1 | 4/2007 | Fung et al. |
| 2007/0094283 A1 | 4/2007 | Fung et al. |
| 2008/0263641 A1 | 10/2008 | Dinh et al. |
| 2008/0271049 A1 | 10/2008 | Dinh et al. |

OTHER PUBLICATIONS

U.S. Appl. No. 12/168,451, Office Action received from USPTO, May 10, 2011.
U.S. Appl. No. 12/099,044, Office Action received from USPTO, Sep. 17, 2010.
"IMS Connector for Java, User's Guide and Reference", IBM VisualAge for Java, Version 3.5, 9 pages, IBM, 1998.
"Quarterdeck Mosaic User Guide", 1995, Chapters 1-7.
"Web Services", www.webopedia.com/TERM/W/Web_services.html, 2003.
"What Web Services Are Not", www.webreference.com/xml/column50, 2003.
"XML Schema Part 2: Datatypes" 2001, W3C <http://www.w3.org/TR/2001/PR-xmlschema-2-20010330>.
Blackman, "IMS eBusiness Update", IMS V8 Roadshow, 11 pages, IBM Corporation, http:www-306ibm.com.software/data/ims/shelf/presentation/oneday/IMSeBusinessUpdate2003.pdf, 2003.
Cover et al., "Web Services User Interface (WSUI) Initiative", http://xml.coverpages.org/wsui.html, Oct. 29, 2002.
Creating WSDL and A Proxy Client From A Web Service, www.west-wind.com/webconnection/docs/_08413N12E.htm, 2002.
Huang et al., Design and Implementation of a Web-based HL7 Message Generation and Validation System, Google 2003, pp. 49-58.
James Martin, "Principles of Object-Oriented Analysis and Design", Oct. 29, 1992, Chapters 1-22.
Microfocus International "DBD, PSB and MFS Statements", 2001, available at <http://supportline.microfocus.com/documentation/books/mx25sp1/imdbds.htm> as of Jun. 16, 2009.
OMG XML Metadata Interchange (XMI) Specification, Jun. 2000, OMG, v1.0.
Parr et al., Distributed Processing Involving Personal Computers and Mainframe Hosts, IEEE 1985, pp. 479-489.
Starkey, "XML-Based Templates for Generating Artifacts from Java-Based Models," Research Disclosure, Dec. 1998, pp. 1678-1680.
Wong, Web services and Enterprise Application Integration, Google Jun. 2002, pp. 1-57.
Google Search for IMS OnDemand SOA IMS MFS Web Solution [retrieved Dec. 17, 2009 at http://www.google.com/search?hl=en$source=hp&q=MFS+MID+MOD+DIF+DOF&aq . . . ].
"NetDynamics, PAC for IMS" User Guide, Precise Connectivity Systems, 1998.
Microsoft Corp, Computer Dictionary, Third Edition, Microsoft Press, 1997, p. 371.
UML™ for EAI. UML™ Profile and Interchange Models for Enterprise Application Integration (EAI). OMG document No. ad/2001-09-17.
"Web Services Description Language (WSDL) 1." Mar. 2001, W3C.
Extensible Markup Language (XML) 1.0 (Second Edition) Oct. 2000, W3C.
"IMS Connect Guide and Reference version 1", Oct. 2000, IBM.
Long et al. "IMS Primer" Jan. 2000, IBM, Chapter 18.
"HostBridge and WebSphere: Integrating CICS with IBM's Application Server," a HostBridge White Paper, Jul. 23, 2002, pp. 1-34.
"S1215, www.ims or Websphere Working with IMS," Ken Blackman, 39 pp. (date unknown).
"Attunity Connect for Mainframe, Native OS/390 Adapters to Data and Legacy," 2003, pp. 1-3.
"Learning Management Systems XML and Web Services," Finn Gronbaek, IBM Corporation, copyright 2001, Apr. 20, 2003, pp. 1-29.
"Correlate IMSADF Secondary Transaction MFS Generation with the Generation of the Output Format Rule", IBM Technical Disclosure Bulletin, vol. 27, No. 1B, pp. 623-624, Jun. 1984.
"Remote Execution of IMS Transactions for OS/2", IBM Technical Disclosure Bulletin, vol. 34, No. 7B, pp. 16, Dec. 1991.
"Connecting to IMS Using XML, SOAP and Web Services", Shyh-Mei F. Ho. IMS Technical Conference, Koenigswinter, Germany, Oct. 15-17, 2002.
"XML and IMS for Transparent Application Integration", Excerpt from http://www.3.ibm.com/software/data/ims/...ntations/two/imsv7enh/HTML/indexp50.htm. IBM Corporation, 2002.
"Web Services—The Next Step in the Evolution of the Web", Excerpt from http://www.3.ibm.com/software/data/ims/...ntations/two/imsv7enh/HTML/indexp51.htm. IBM Corporation, 2002.
"Leveraging IMS Applications and Data" < Excerpts from Leveraging IMS2 found at http://www.3.ibm.com/software/data/ims/...ntations/two/imsv7enh/HTML/indexp52.htm IBM Corporation, 2002.
"What's Next in IMS Providing Integrated e-business Solutions: IMS Version 8", Excerpt from http://www.3.ibm.com/software/data/ims/...ntations/two/imsv7enh/HTML/indexp53.htm IBM Corporation, 2002.
"IMS Follow-on Ideal for e-business", Excerpts from http://www.3.ibm.com/software/data/ims/...ntations/two/imsv7enh/HTML/indexp54.htm IBM Corporation, 2002.
"IMS Information", Excerpts from http://www.3.ibm.com/software/data/ims/...ntations/two/imsv7enh/HTML/indexp55.htm IBM Corporation, 2002.
Hofstetter, The Future's Future: Implications of Emerging Technology for Special Education Program Planning, Journal of Special Education Technology, Fall 2001, vol. 16, p. 7, 7 pgs.
Diaz et al., Inter-Organizational Document Exchange—Facing the Conversion Problem with XML, ACM 2002, pp. 1043-1104.
Arndt et al., An XML-Based Approach to Multimedia Software Engineering for Distance Learning, ACM 2002, pp. 525-532.
Glushko et al., An XML Framework for Agent-Based E-Commerce, ACM Mar. 1999, pp. 106-114.
Dymetman at al., XML and Multilingual Document Authoring : Convergent Trends, ACM Jul. 2000, pp. 243-249.
PR Newswire, XMLSolutions Delivers XML-based Prototype for Envera Marketplace, ProQuest, Apr. 2000, pp. 1-3.
Suzuki et al., Managing the Software Design Documents with XML, ACM 1999, pp. 127-136.

(56) References Cited

OTHER PUBLICATIONS

Stieren, SST: Using Single-sourcing, SGML, and Teamwork for Documentation, ACM 1999, pp. 45-52.

Cover, Robin et al. http://xmlcoverpages.org/wscm.html, 2007 PR Newswire, Sterling Commerce Announces Availability of First Data Transformation Engine to Support Both XML and Traditional EDI Standards, ProQuest May 12, 1999, pp. 1-3.

Royappa, Implementing Catalog Clearinghouses with XML and XSL, ACM 1998, pp. 616-623.

Jantti, Jouko et al. "Soultions for IMS Connectivity," http://www-1.ibm.com/support/docsview.wss?uid=swg27009024&aid=1, Feb. 2006.

"MFS XML Utility Version 9.3.0 User's Guide and Reference," IBM 2003, 2005.

Component of the Week: XMI Toolkit:, Jun. 1, 2001 http://www-106.ibm.com/developerworks/library/co-cow21.html.

Absa Uses VGR to Ensure Online Availability, www-306.ibm.com/software/data/ims/quarterly/Winter2000/winter.htm.

Application Development/Enablement, http://www.306.ibm.com/software/data/ims/presentation/five/trends2003/HTML/indexp15.htm Nov. 11, 2003.

Newport, Billy, "Requirements for Building Industrial Strength Web Services: The Service Broker" EJB Consultant, Jul. 2001.

Jantti, Jouko, "IMS Version 9 Implementation Guide: A Technical Overview," IBM.com/redbooks, Dec. 2004.

\* cited by examiner

METHOD FOR FACILITATING TRANSACTIONS BETWEEN THIN-CLIENTS AND MESSAGE FORMAT SERVICE (MFS)-BASED INFORMATION MANAGEMENT SYSTEM (IMS) APPLICATIONS

CROSS-REFERENCES TO RELATED APPLICATIONS

This application is a continuation of, and claims priority from, U.S. Pat. No. 7,421,701 entitled "SYSTEM FOR FACILITATING TRANSACTIONS BETWEEN THIN-CLIENTS AND MESSAGE FORMAT SERVICES (MFS)-BASED INFORMATION MANAGEMENT SYSTEM (IMS) APPLICATIONS", filed 18 Mar. 2005. U.S. Pat. No. 7,421,701 is a continuation-in-part of U.S. Pat. No. 7,418,508 entitled "SYSTEM AND METHOD FOR FACILITATING XML TRANSACTIONS WITH MFS-BASED IMS APPLICATIONS" and filed on Sep. 16, 2002 for Chenhuel J. Chiang, Shyh-Mei F. Ho, Jenny Chengyin Hung, and Benjamin Johnson Sheats, and U.S. patent application Ser. No. 10/244,711 entitled "SYSTEM AND METHOD FOR RENDERING MFS XML DOCUMENTS FOR DISPLAY" and filed on Nov. 27, 2002 for Chenhuel J. Chiang, Shyh-Mei F. Ho, Jenny Chengyin Hung, and Benjamin Johnson Sheats, and U.S. Pat. No. 7,130,893 entitled "SYSTEM AND METHOD FOR REPRESENTING MFS CONTROL BLOCKS IN XML FOR MFS-BASED IMS APPLICATIONS" and filed on May 19, 2003 for Chenhuel J. Chiang, Shyh-Mei F. Ho, Benjamin Johnson Sheats, and Eddie Raymond Yep.

BACKGROUND OF THE INVENTION

1. Field of the Invention

The present invention relates generally to computer software, and more specifically to IMS software.

2. Description of the Related Art

By some estimates, nearly seventy percent (70%) of corporate data in the United States and abroad resides on mainframe computers, e.g., S/390 mainframes manufactured by International Business Machines. Moreover, business-to-business (B2B) e-commerce is expected to grow at least five times faster than the rate of business-to-consumer (B2C) e-commerce. Many transactions involving this corporate data can be initiated by Windows/NT servers, UNIX servers, and other servers but the transactions must be completed on the mainframe using existing legacy applications residing thereon.

One group of legacy applications are the message format service-based information management system applications ("MFS-based IMS applications") on which many businesses depend heavily. MFS is a facility of the IMS transaction management environment that formats messages to and from many different types of terminal devices. As businesses upgrade their technologies to exploit new B2B technologies, there is a requirement for an easy and effective method for upgrading existing MFS applications to include e-business capabilities. One such e-business capability is the ability to send and receive MFS-based IMS transaction messages using thin-client software operating on a variety of devices. In addition, it is desirable to send and receive MFS-based IMS transaction messages using extensible Markup Language (XML) documents.

The MFS language utility compiles MFS source, generates MFS control blocks in a proprietary format, known as Message Input/Output Descriptors (MID/MOD), and places them in an IMS format library. MFS supports several terminal types, e.g., IBM 3270 terminals, and it was designed so that the IMS application programs using MFS do not have to deal with any device-specific characteristics in the input or output messages. Because MFS provides headers, page numbers, operator instructions, and other literals to the device, the application's input and output messages can be built without having to pass these format literals. MFS identifies all fields in the message response and formats these fields according to the specific device type. This allows application programmers to concentrate their efforts on the business logic of the programs.

Because the IMS application program input/output data structures do not fully describe the end user interaction with these existing MFS applications, there exists a need for dealing with information that is buried within various MFS statements. Examples of this information includes 3270 screen attribute bytes and preset function key (PFKey) input data. Many MFS-based IMS application programs are passed PFKey data in input messages, but application logic is not required to recognize that a certain PFKey was pressed and a literal corresponding to that PFKey must be inserted into the input message. This is due to the fact that, at runtime, it is the MFS online processing and not the application that places the literal that corresponds to the PFKey pressed into the appropriate field in the input message.

MFS-based IMS application programs predominately include conversational transactions between a client and the MFS-based IMS application program. Conversational transactions are transactions in which the status of the transaction is maintained beyond a single request and response exchange. Conversational transactions typically include a plurality of request and response exchanges to complete the transaction.

XML has become the preferred data format to support thin-software clients, Web services, B2C and B2B interchanges. However, presently, there seems to be a need for software to handle preprocessing, processing, and formatting of MFS-based commands, especially to support conversational transactions. Furthermore, there appears to not exist a way for HyperText Transfer Protocol (HTTP) requests to be presented to an MFS-based IMS application and HTTP responses returned.

Accordingly, there is a need for a system, method, and apparatus which will facilitate conversational transactions between thin-client software and MFS-based IMS applications. The conversational transactions could be managed for a plurality of MFS-based IMS applications by a central system, method, or apparatus. In a business-to-consumer environment, the conversational transactions may be conducted via an Internet browser or other thin-client. The system, method, and apparatus should manage paging requests made by a user and format output based on progress of a user through physical pages of one or more logical pages for an MFS-based IMS application.

SUMMARY OF THE INVENTION

The present invention has been developed in response to the present state of the art, and in particular, in response to the problems and needs in the art that have not yet been fully solved by currently available interfaces to MFS-based IMS applications. Accordingly, the present invention has been developed to provide an apparatus, system, and method for facilitating transactions between thin-clients and MFS-based IMS applications that overcome many or all of the above-discussed shortcomings in the art.

The apparatus for facilitating transactions between thin-clients and MFS-based IMS applications is provided with a logic unit containing a plurality of components configured to functionally execute the necessary steps. These components in the described embodiments include a security module, a connection module, a state module, and a control module.

The security module authenticates security credentials of a user operating a thin-client. Preferably, the user enters security information such as username, userid, password, and/or group identifier at a default MFS-based IMS application interface screen. The security module authenticates the security information provided by the user. Preferably, the security module authenticates the user using a mainframe security control subsystem such as a Resource Access Control Facility (RACF) accessible to the security module.

The connection module establishes a connection with an MFS-based IMS application. Preferably, the MFS-based IMS application is uniquely identifiable by an indicator provided by a user. In certain embodiments, the connection module establishes the connection to support a conversational transaction by way of an MFS adapter, also referred to herein as an MFS XML adapter. Preferably, the connection module is configured to manage a plurality of connections between a plurality of thin-clients and a plurality of MFS-based IMS applications of a particular mainframe host.

The state module preserves and maintains connection information associated with the connection and conversation-specific information based on one or more transaction messages from the thin-client. In particular, the state module is configured to change the connection information and conversation-specific information as transaction messages requires changes to the connection. For example, a transaction message comprising a conversational command to "HOLD" may cause a current connection to be stored by the state module and a new connection to be established by the connection module.

The control module processes a transaction message. The transaction message may be of multiple types including conversational, formatting, security information, function key, paging, and the like. Accordingly, the control module may include a function key module, a page module, a command module, and a formatter. Depending on the type of transaction message and the state information maintained by the state module, the control module selectively sends input data to an MFS-based IMS application. Preferably, the input data is sent by way of MFS adapter. The formatter converts conversation output messages from MFS-based IMS applications into a format compatible with the thin-client operating on a particular device. In one embodiment, the control module combines XML Metadata Interchange (XMI) information and XML Stylesheet Language (XSL) information to produce HTTP information compatible with the thin-client.

A system is also presented for facilitating transactions between thin-clients and MFS-based IMS applications. The system includes components substantially similar to those described above in relation to different embodiments of the apparatus. The system includes an IMS interface configured to execute on a mainframe operating system and enable conversational transactions between an MFS-based IMS application and a Transmission Control Protocol/Internet Protocol (TCP/IP) client. A web module of the system is configured to operate on a web application server as the TCP/IP client and translate between XML conversation messages and a byte stream compatible with the IMS interface.

The web application server may also include a conversational transaction servlet comprising, a state module configured to store conversation attributes associated with conversational transactions between a thin-client and the MFS-based IMS application over a network, and update the stored conversation attributes in response to a change in the conversation attributes caused by one or more transaction messages.

A preprocessor of the conversational transaction servlet may be configured to preprocess one or more transaction messages from the thin-client based on a transaction message type. A formatter of the conversational transaction servlet may be configure to format a conversation output message for the thin-client according to the conversation attributes.

A method is also presented for facilitating transactions between thin-clients and MFS-based IMS applications. The method in the disclosed embodiments substantially includes the steps necessary to carry out the functions presented above with respect to the operation of the described apparatus and system.

In one embodiment, the method includes storing conversation attributes associated with a conversational transaction between a thin-client and an MFS-based IMS application. The conversation attributes include connection information and conversation-specific information. The method further includes preprocessing one or more transaction messages from the thin-client based on a transaction message type, updating the stored conversation attributes in response to a change in the conversation attributes caused by the one or more transaction messages, and formatting a conversation output message for the thin-client.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS

One preferred embodiment, in accordance with the present invention, is directed to a programmed method for facilitating transactions between thin-clients and MFS-based IMS applications. The term "programmed method", as used herein, is defined to mean one or more process steps that are presently performed; or, alternatively, one or more process steps that are enabled to be performed at a future point in time. This enablement for future process step performance may be accomplished in a variety of ways. For example, a system may be programmed by hardware, software, firmware, or a combination thereof to perform process steps; or, alternatively, a computer-readable medium may embody computer readable instructions that perform process steps when executed by a computer.

The term "programmed method" anticipates four alternative forms. First, a programmed method comprises presently performed process steps. Second, a programmed method comprises a computer-readable medium embodying computer instructions, which when executed by a computer, perform one or more process steps. Third, a programmed method comprises an apparatus having hardware and/or software modules configured to perform the process steps. Finally, a programmed method comprises a computer system that has been programmed by software, hardware, firmware, or any combination thereof, to perform one or more process steps.

It is to be understood that the term "programmed method" is not to be construed as simultaneously having more than one alternative form, but rather is to be construed in the truest sense of an alternative form wherein, at any given point in time, only one of the plurality of alternative forms is present. Furthermore, the term "programmed method" is not intended to require that an alternative form must exclude elements of other alternative forms with respect to the detection of a programmed method in an accused device.

Figure 1:
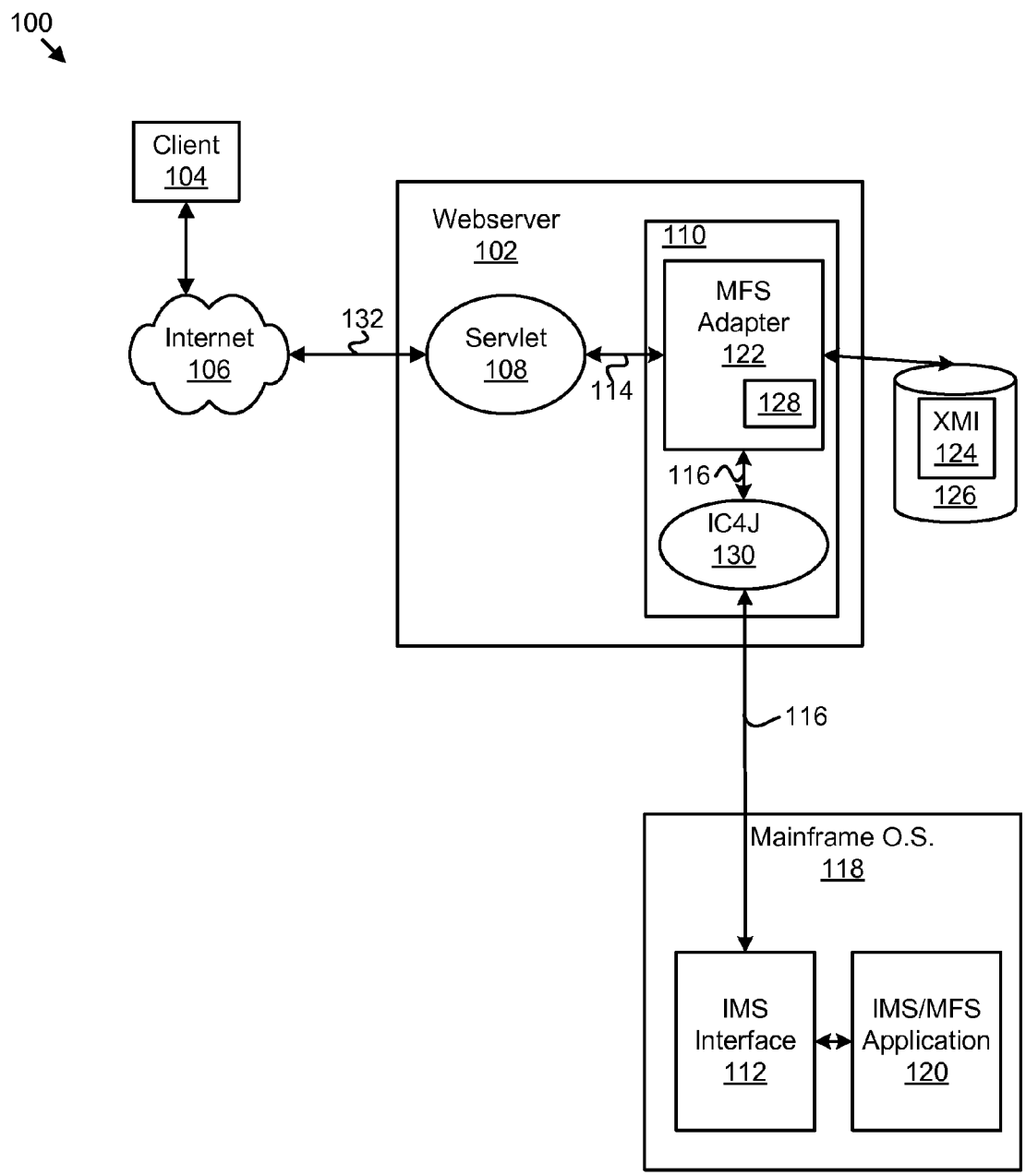
FIG. 1 is a schematic block diagram illustrating one embodiment of a system for facilitating transactions between thin-clients and MFS-based IMS applications.

FIG. 1 illustrates a system 100 for facilitating transactions between thin-clients and MFS-based IMS applications. Typically, this system 100 is used for Business-to-Consumer (B2C) transactions and not Business-to-Business (B2B) transactions. The system 100 includes a webserver 102 configured to serve as an application server. It is to be understood that this webserver 102 can be a WebSphere application server (WAS) or any other equivalent web application server system, e.g., TomCat, etc.

As shown, the system 100 includes one or more client computing devices 104 connected by a network 106 such as the Internet 106 to the webserver 102. It is to be understood that client software operating on the client computing devices 104 can communicate with an MFS-based IMS application, described below, via the Internet 106 and the webserver 102.

Within the webserver 102, one or more conversational transaction servlets 108 (also referred to simply as servlets 108) load in eXtensible Stylesheet Language (XSL) information for rendering display output sent to the computing devices 104. The result of the rendering, e.g., an HTML document, is sent back to the computing devices 104 preferably in an HTTP response.

Each servlet 108 communicates with a web module 110 configured to operate on the web application server 102. In one embodiment, the servlet 108 comprises a servlet defined using the Java programming language. Similarly, the web module 110 may comprise a Java programming language object such as an Enterprise Java Bean (EJB). The web module 110 serves as a client to an IMS interface 112. The web module 110 preferably communicates with the IMS interface 112 using the TCP/IP protocol. The web module 110 translates XML messages 114 received from a servlet 108 to a byte stream 116 compatible with the IMS interface 112. The messages 114 may relate to a conversational transaction or a nonconversational transaction.

The IMS interface 112 may execute on a mainframe operating system (OS) 118 that hosts one or more MFS/IMS applications 120. The IMS interface 112 is configured to enable conversational and nonconversational transactions between an MFS-based IMS application 120 and a client, such as the web module 110, without changing the MFS-based IMS application 120. Furthermore, the IMS interface 112 may support modern protocols such as TCP/IP.

Preferably, the web module 110 includes an MFS adapter 122 configured to map XML messages 114, typically in the form of XML documents, pertaining to the computing device 104 into the appropriate MFS byte stream and vice versa. The MFS adapter uses XMI files 124 stored in an XMI repository 126.

Preferably, the XMI files 124 are generated directly from MFS source files. In one embodiment, an MFS mapper 128 within the MFS adapter 122 loads XMI files that describe the MFS-based application interface using the MFS Metamodel discussed in U.S. patent application Ser. No. 09/849,105, filed on May 4, 2001, incorporated herein by reference, which is part of the Common Application Metamodel (CAM) disclosed in U.S. Patent Application Ser. No. 60/223,671 filed Aug. 8, 2000, also incorporated herein by reference. Preferably the XMI files are preprocessed and generated from MFS source files.

Typically, there are three external reference pointers to a particular MFS source file: message input descriptor (MID), message output descriptor (MOD), and table. The MFS mapper 128 may generate three XMI files 124 for the three external reference pointers. These three files include a "midname.xmi" file for each MID with its associated device input format (DIF), a "modname.xmi" file for each MOD with its associated device output format (DOF), and a "tablename.xmi" file. These XMI files 124 represent all the application interface information encapsulated by the MFS source including the input and output messages, display information, MFS flow control, device characteristics and operation semantics. With these XMI files and the MFS adapter 122, MFS-based IMS applications 120 can support B2B or B2C XML communication without altering the MFS-based IMS application 120.

The MFS adapter 122 converts XML messages 114 into a byte stream that is sent to an IMS connector for Java (IC4J) 130. The IC4J 130 sends the byte stream 116 to the mainframe 118, e.g., an IBM S/390, Z/OS, etc, via a TCP/IP connection.

At the mainframe, the byte stream 116 is received by an IMS interface 112 such as IMS connect (IC) which, in turn, sends the byte stream 116 to an IMS transaction system within the IMS space of the mainframe 118. In a preferred embodiment, the IMS transaction system includes a control region and a transactional application region where the IMS applications 120 reside.

Preferably, the MFS adapter 122 uses interpretive marshaling based on dynamical lookup of XMI files to ensure system stability. The MFS adapter 122, when converting to and from a byte steam 116, may use predetermined Type Descriptor classes in the XMI file 124 to perform the low level UNICODE to extended binary coded decimal information code (EBCDIC) conversion.

The servlet 108 works in conjunction with the MFS adapter 122 to transform an HTTP request 132 into a byte stream 116 as input to the IC4J 130 and produce an HTTP response 132 on return. The servlet 108 is responsible for handling display information, handling conversational commands, maintaining conversation state, and selectively communicating with the MFS adapter 122. The MFS adapter 122 is responsible for transforming the XMI 124 and any input data into a byte stream 116 and communicating with the IC4J 130—handling both device and message information. In one embodiment, the MFS adapter 122 and the IC4J 130 operate under the J2EE framework.

Further, it is to be understood that all the servlets 108 may be subclassed, or inherited, from a generic MFS servlet object that contains a substantial portion of the logic code of the present invention. The generic servlet is responsible for processing the HTTP XML request, invoking the MFS adapter 120, rendering the output for a client 104, and loading the stylesheet. Preferably, the generic MFS servlet is configured to cache an entire input message and output message and only return a single page at time to the client computing device 104.

Thus, the client 104 can page through logical pages and physical pages without making extra requests to the MFS adapter 122 (and the MFS-based IMS application 120). In a preferred embodiment, the generic servlet passes to a predetermined stylesheet only the device page and device fields pertaining to the current physical and logical page. Preferably, an instance servlet 108 may be generated for each connection to IMS. Once an HTTP session is established with a particular client 104, the servlet 108 tracks the page the client 104 is currently viewing. The instance servlet 108 can provide key details regarding a specific transaction. These details can include IMS information (e.g., hostname, port number, and data store name), stylesheet name, and the like.

Figure 2:
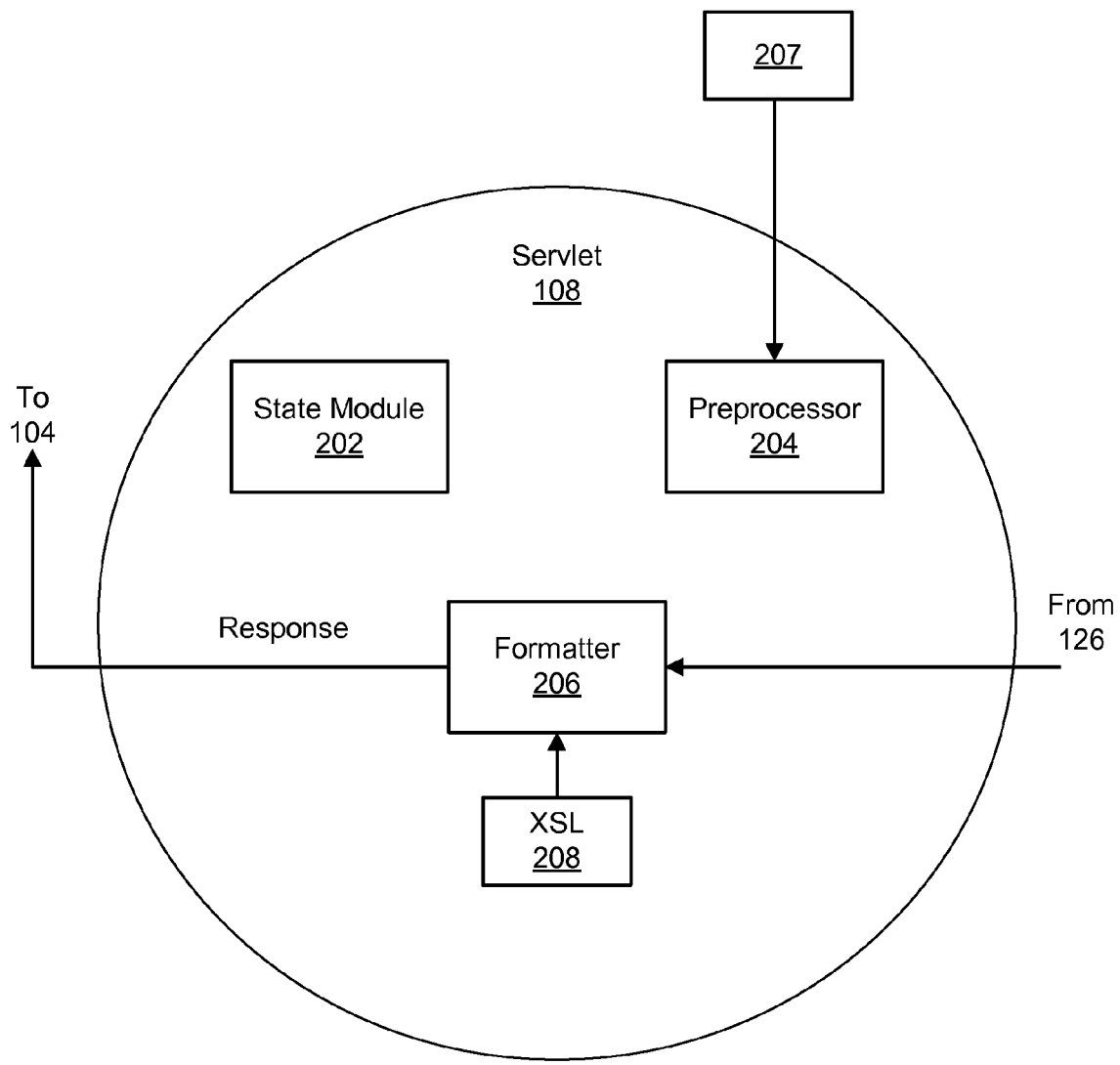
FIG. 2 is a schematic block diagram illustrating one embodiment of an apparatus for facilitating transactions between thin-clients and MFS-based IMS applications.

FIG. 2 illustrates one embodiment of a conversational transaction servlet 108 in more detail. The servlet 108 includes a state module 202, a preprocessor 204, and a formatter 206. The state module 202 stores conversation attributes associated with conversational transactions between a thin-client 104 and the MFS-based IMS application 120 over the network 106. In addition, the state module 202 updates the conversational attributes in response to a change caused by one or more transaction messages 207 received by the servlet 108. Advantageously, the state module 202 makes the conversation attributes available to the MFS adapter 122 such that a conversational transaction can be maintained.

The preprocessor 204 preprocesses one or more transaction messages from the thin-client 104 based on transaction message type. Certain transaction message types may require information to be sent to the MFS adapter 122. Other message types may relate to paging, conversational commands, format commands, or the like.

The formatter 206 formats a conversation output message for the thin-client according to the conversation attributes. In particular, the formatter 206 may combine an XMI file 124 or a portion thereof with XSL information 208, e.g. an XSL file 208, to produce HTML suitable for display on the client 104. The XSL 208 may reside in a storage device, repository, or other similar location. Preferably, the XSL 208 is configurable by an administrator or even an end-user by way of a utility program.

Figure 3:
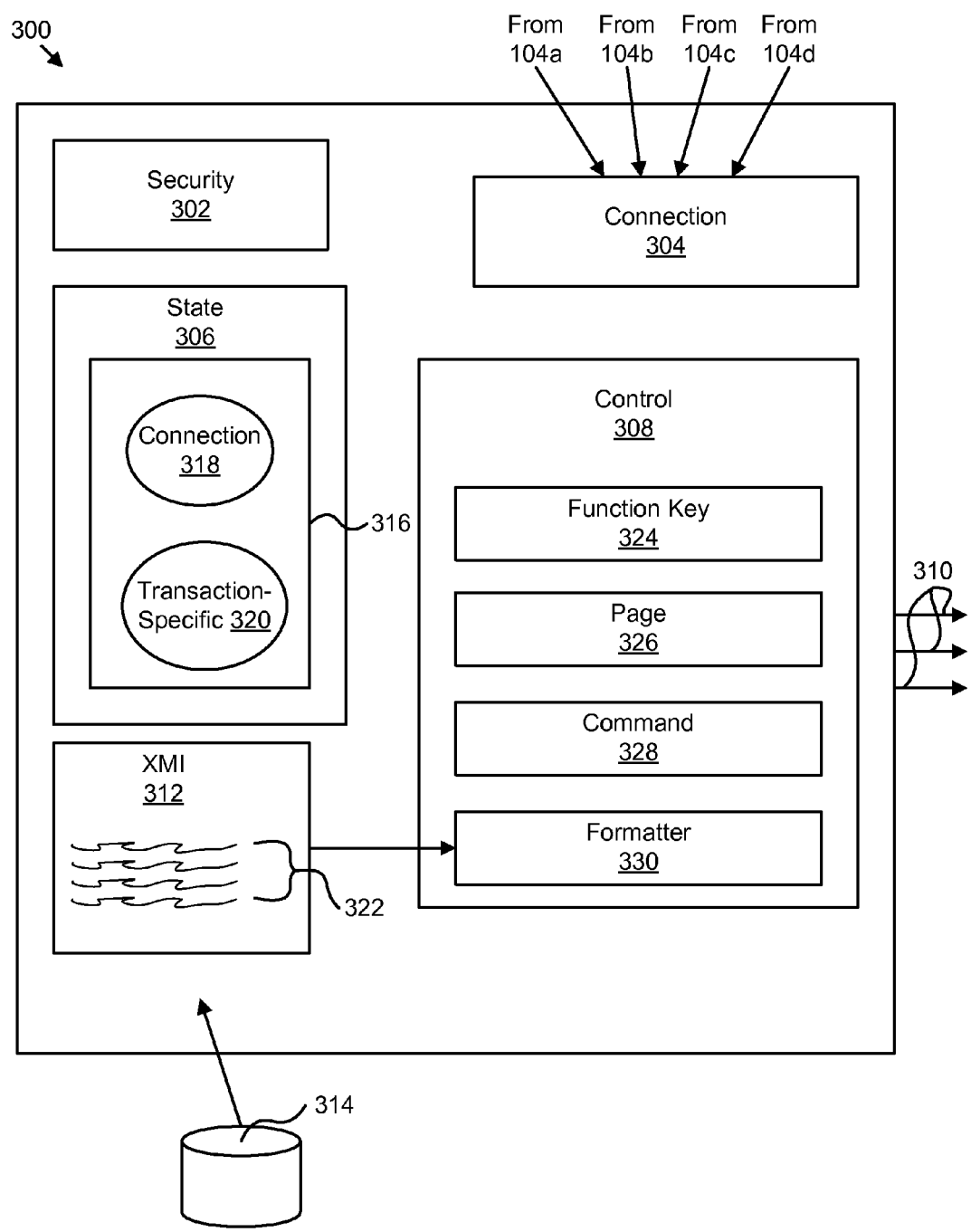
FIG. 3 is a schematic block diagram illustrating one embodiment of another apparatus for facilitating transactions between thin-clients and MFS-based IMS applications.

FIG. 3 illustrates one embodiment of an apparatus 300 suitable for facilitating transactions between thin-clients and MFS-based IMS applications. The apparatus 300 includes modules and components similar to those described in relation to the system 100 described in relation to FIGS. 1 and 2. Specifically, the apparatus 300 includes a security module 302, a connection module 304, a state module 306, and a control module 308.

The security module 302 preferably authenticates security credentials for a user operating a thin-client 104. The user may enter the security credentials at a blank startup screen. Alternatively, the thin-client 104 may store the security credentials. Advantageously, the security module 302 passes the security credentials to an existing security subsystem such that new security logic and safeguarding of security credentials is not necessary. In one embodiment, the existing security subsystem comprises a mainframe security control subsystem such as a Resource Access Control Facility (RACF). In one embodiment, the security module 302 communicates security credentials (a user ID, a user password, a group name) to the RACF through the connection module 304. The connection module 304 preferably includes the security credentials along with transaction related data. The RACF preferably authenticates the user prior to responding to a request included with the security credentials.

The connection module 304 establishes a connection 310 to an MFS-based IMS application 120. Preferably, the connection 310 supports both conversational transactions and nonconversational transactions and uses the MFS adapter 122 A connection 310 allows single or multiple request-response interactions. A nonconversational transaction may involve a single request-response interaction. A conversational transaction may involve multiple request-response interactions. Is reused in a conversation as a plurality of request-response interactions.

As a result, the MFS-based IMS application 120 typically is allocated a Scratch Pad Area (SPA) which is used by the MFS-based IMS application 120 to track and retain the state of the conversation. For example, a simple MFS-based IMS application 120 that serves up personal check images, may retain a customer's account information in the SPA such that a customer may view a plurality of check images without repeatedly entering his/her check account number as with a standard connection to an MFS-based IMS application 120.

The connection module 304 preferably manages all aspects of establishing, maintaining, and terminating a connection 310. Preferably, the connection module 304 permits a plurality of clients 104a-d to establish a plurality of connections 310 with a plurality of the same or different MFS-based IMS applications 120 so long as the MIDs and MODs for these MFS-based IMS applications 120 have corresponding XMI files 312 in the XMI repository 314. Of course a communication path between the apparatus 300 and the appropriate IMS should also exist.

Typically, a request from the client 104 is an HTTP request that includes an indicator of the MOD desired by the user. The MOD is associated with a single MFS-based IMS applications 120. The HTTP request may also include a host indicator that identifies the mainframe OS 118. Furthermore, the initial HTTP request preferably includes security credentials for the user. The connection module 304 cooperates with the security module 302 to establish a connection 310. Once established, the connection module 304 routes transaction messages received from the clients 104a-c, as appropriate, through the proper connection 310.

The state module 306 preserves and maintains the state of each connection 310. As used herein, the state of a connection 310 includes conversation attributes 316. Conversational attributes 316 comprise information relating to the connection 310 and to the status of the conversation. Certain embodiments, may use optionally conversational attributes 316 to support nonconversational transactions. In one embodiment, the conversational attributes 316 comprise connection information 318 and conversation-specific information 320.

transaction information 318 includes data such as a host identifier for the host of the MFS-based IMS application 120, datastore name, port number, and RACF security credential. With the connection information 318, the connection module 304 can establish and re-establish the connection 310 as necessary.

The conversation-specific information 320 includes information such as the current physical page displayed to the user, the current logical page being displayed, the total physical page count, the name of the XML style sheet to be used, the most recent MID name and/or MOD name. In addition, the conversation-specific information 320 may include the MID XMI identifier and/or MOD XMI identifier for accessing the XMI file 312 or subset 322 thereof. Alternatively, the MID XMI identifier and/or MOD XMI identifier may be simple mappings of the MID name and/or MOD name. For example, the MOD XMI identifier may comprise the MOD name plus a .xmi extension.

The state module 306 changes the conversation attributes 316 based on transaction messages from the thin-clients 104a-d. For example, as a transaction message indicates a next page request, the state module 306 changes the current physical page indicator and potentially the current logical page indicator. In addition, if a conversational command is received, the state module 306 may store a current set of connection information 318 and generate a new set of connection information 318 to support a conversational HOLD command.

The control module 308 preferably includes main logic for processing transaction messages according to transaction message type. The control module 308 determines whether a transaction message requires information to be sent to the MFS adapter 122 or whether the apparatus 300 can satisfy the transaction message without interaction with the MFS adapter 122.

The control module 308 includes a function key module 324, a page module 326, a command module 328, and a formatter 330. Preferably, each module 324, 326, 328, 330 is configured to respond to the client 104 and selectively interact with the MFS adapter 122 according to a particular type of transaction message.

The function key module 324 receives transaction messages that include a function key indicator. Typically, the screen displayed to a user at the client 104a-d includes a plurality of buttons or icons associated with, and designated as function keys. These user interface function keys correspond to original function keys on keyboards of legacy keyboards and terminals that originally interfaced with the MFS-based IMS applications 120. The interface function keys are often designated "PF1-PFn." Advantageously, users operating the clients 104a-d are able to use familiar function keys that operate identically to the function keys that were available on legacy keyboards and terminals. Consequently, minimal training is required for a user to be efficient using the thin-clients 104a-d.

The function key transaction messages include the function key indicator which may map to a literal data value or to a control command. In one embodiment, the function key module 324 searches a set of XMI 312 associated with a particular connection 310 for the function key indicator. Typically, the XMI 312 relates to a particular MFS-based IMS application 120. The XMI 312 may indicate whether the function key maps to a literal value or a control command. A literal value is a data value that is to be inserted into a main command from the client 104a-d. In certain embodiments, the literal value may be used as a macro that inserts proper command and control syntax into statements to facilitate interaction with the MFS-based IMS application 120. Preferably, the function keys are defined in the MOD/MID source files which are translated into the XMI 312.

If the function key is a control command, the function key module 324 processes the control command. Examples of control commands include requesting the next physical page, requesting the next logical page, and ending multipage input mode. To end a multipage input mode, the function key module 324 may communicate with the state module 306 to set or unset an indicator in the conversation-specific information 320. Paging requests may be passed along to the page module 326.

The page module 326 handles paging requests. Paging requests refer to requests from a user to traverse one or more physical pages within a logical page and one or more logical pages associated with a given MFS-based IMS application 120. A physical page comprises an input or output page sized to fit the displayable area available on the computing device operating the client 104a-d. A logical page comprises a collection of one or more physical pages.

Typically, the MFS-based IMS application 120 and MFS adapter 122 are configured to accept and return a single logical page at a time. Consequently, the page module 326 allows a user to traverse the physical and logical pages in response to paging requests. Paging requests may move forward or backward through the physical and/or logical pages. Paging requests may be associated with function keys or with specific user interface button or icons. For example, buttons displayed to the user may read "Next Page," "Previous Page," "First Page," and "Last Page." In addition, or alternatively, the buttons may include moving ahead or back N number of pages.

Preferably, the page module 326 communicates with the state module 306 to locate the requested page and return the requested page to a user. The state module 306 may cache a plurality of physical pages for a single logical page. Consequently, the state module 306 may provide the requested physical page to the page module 326. If the physical page is not cached for the apparatus 300, the page module 326 may interact with the MFS adapter 122 to request the desired page. As paging requests are fulfilled the state module 306 adjusts the conversation attributes 316 as appropriate. In addition, paging requests typically result in changes to a conversation output message sent to the client 104 because the client 104 may handle a single physical page at a time.

The command module 328 processes transaction messages comprising conversational commands and a format command such as "FORMAT". Conversational commands comprise command statements such as "EXIT," "HOLD," and "RELEASE". Preferably, the MFS adapter 122 includes logic for responding to the conversational commands. Alternatively, this logic resides within the command module 328.

In response to an EXIT command, the command module 328 causes the connection 310 to be terminated. Consequently, a blank login-type screen may be presented on the client 104*a-d*. In response to a HOLD command, the command module 328 interacts with the state module 306 and/or the MFS adapter 122 to store the current connection 310 and initiate a new connection 310. In response to a RELEASE command, the command module 328 may retrieve a previously stored connection 310. The connection 310 may be identified by an identifier included in the conversational command. Those of skill in the art will recognize that a conversational command may cause the connection information 318 specific information 320. The XMI subset 322 may comprise the field labels, fields, field types, field sizes, buttons, icons, and the like for the screen that is presented to the user. In addition, the XMI subset 322 may indicate the order in which a user may tab through the fields displayed, whether a field is protected from editing, and the initial field for placement of a cursor on the screen. Because the XMI 312 is generated from the MIDs/MODs of an MFS-based IMS application 120, the output data rendered by the formatter 330 retains substantially the same look-and-feel as a user would experience on a legacy hardware such as a 3270 terminal. Example 1 lists an example of an XMI subset 322 for illustration.

Example 1

```
<?xml version="1.0" encoding="UTF-8"?> <xmi:XMI xmi:version="2.0"
xmlns:xmi"http://www.omg.org/XMI"xmlns:mfs ="mfs.xmi">
    <mfs:MFSFormat xmi:id="MFSFormat_1">
        <devices xmi:id="MFSDevice_1">
        <devicePages xmi:id="MFSDevicePage_1">
            <deviceFields    xmi:id="MFSDeviceField_1"    label="LABEL1"    value
            ="VALUE1">
            <deviceFields    xmi:id="MFSDeviceField_2"    label="LABEL2"    value
            ="VALUE2">
            . . .
            <deviceFields    xmi:id="MFSDeviceField_N"    label="LABELN"    value
            ="VALUEN">
        </devicePages> <division xmi:id="MFSDeviceDivision/" type="in">
        </devices>
    </mfs:MFSFormat>
</xmi:XMI>
``` managed by the state module 306 to be changed such that the conversation continues as desired.

A FORMAT command (which may be abbreviated as FOR) typically includes the name of a specific MOD. In response to a FORMAT command, the command module 328 may search the XMI file 312 for a subsection 322 associated with the given modname. Upon finding the proper subsection 322, the command module 328 may interact with the formatter 330 to render an output screen for the client 104*a-d* based on requested MOD name.

The command module 328 permits a stateless protocol such as HTTP to interface with a state-sensitive connection such as a conversational transaction. In this manner, current, proven, legacy, MFS-based IMS applications 120 are capable of interfacing with users operating a variety of computing devices executing the thin-client 104 over modern technologies and protocols. Advantageously, the users experience a user-interface having substantially the same look-and-feel. Consequently, re-training of users to use the new technology is either not required or minimal.

The formatter 330 renders HTML data for presentation by the client 104*a-d*. Typically, the formatter 330 operates on a conversation output message. The conversation output message may include output data from the MFS-based IMS application 120 and/or cached pages from the state module 306. In one embodiment, the formatter 330 combines the output data, XMI data such as an XMI subset 322, and XSL 208 to render output data suitable for display on the client 104*a-d*. Preferably, the output data is in HTML format.

Figure 4:
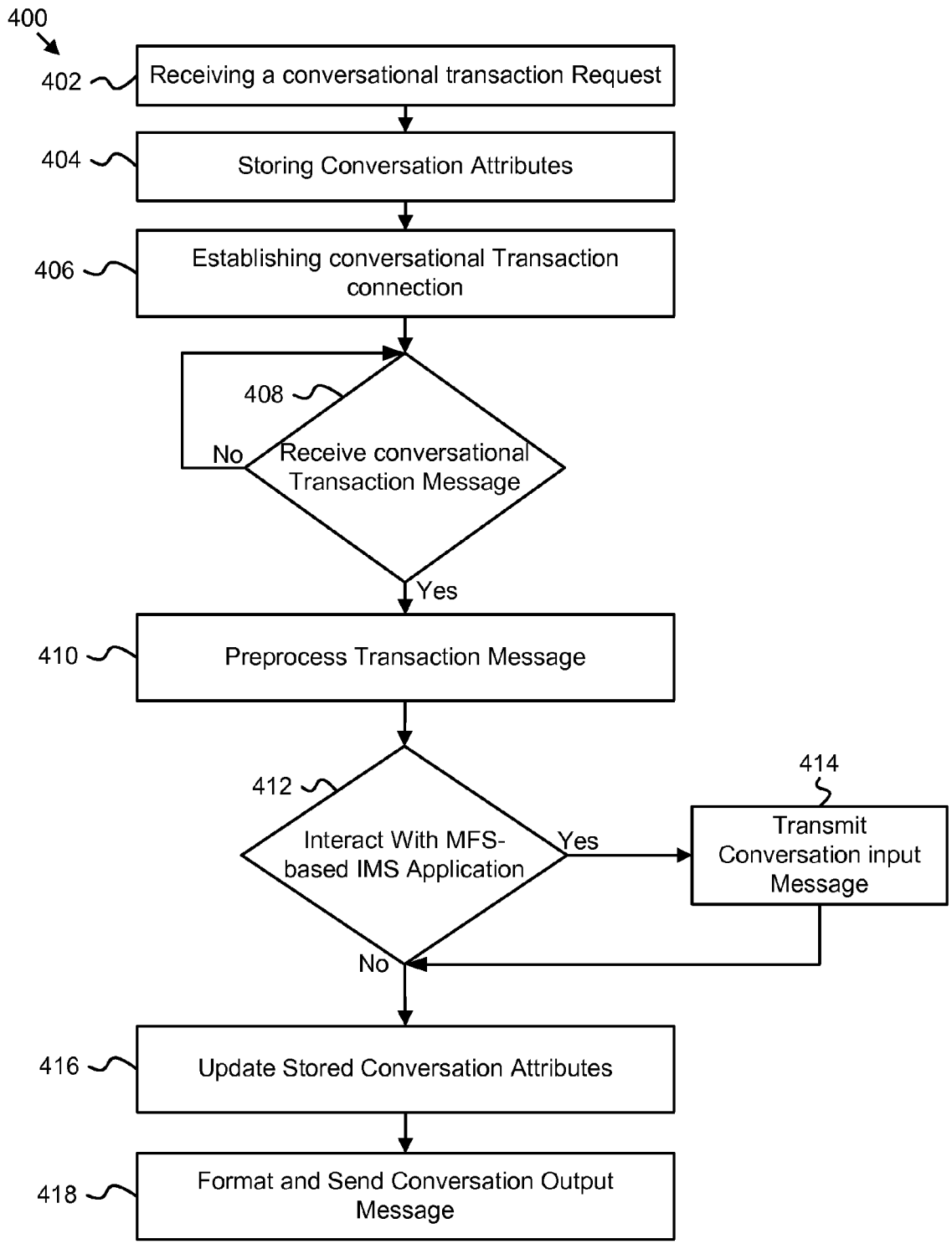
FIG. 4 is a schematic flow chart diagram illustrating one embodiment of a method for facilitating transactions between thin-clients and MFS-based IMS applications.

The formatter 330 may retrieve the XMI subset 322 from the XMI file 312 or an XMI repository 314. In addition, or in the alternative, the XMI subset 322 may be identified at least in part by the page information with in the conversation- FIG. 4 illustrates one embodiment of a method 400 for facilitating transactions between thin-clients and MFS-based IMS applications. The method 400 may be implemented using the system 100 or apparatus 300 discussed above. Those of skill in the art recognize that hardware and/or software implementing portions of the present invention may be implemented in various modules within the system 100. Preferably, the thin-client 104 includes a minimal amount of logic to implement the present invention. For example, the thin-client 104 may include minimal java script to implement user interface buttons. In addition, the IMS interface 112 and IC4J are preferably unchanged to implement the present invention.

Initially, a servlet 108 and/or connection module 304 receive 402 a transaction request. Preferably, the transaction request is in the format of an HTTP message such as a get or post message. The webserver 102 routes the transaction request to the servlet 108.

Next, the state module 202, 306 stores 404 conversation attributes 316 defined for a connection 310. Storing conversation attributes 316 allows the servlet 108 to manage the state of the connection 310 for a conversational transaction. The connection module 304 communicates, in one embodiment, with an MFS adapter 122 to establish 406 a connection 310. In one embodiment, the connection module 304 is embedded in a servlet 108 which reads host information from a deployment descriptor file to establish a connection 310. The transaction connection 310 may comprise a communication session with the IMS interface 112 using IC4J 130. In certain embodiments, the servlet 108 may represent connections using a session object. The IMS interface 112 establishes a connection with the MFS-based IMS application 120.

Next, the servlet 108 or apparatus 300 waits for conversational transaction messages. A conversational transaction message is a message from a client 104 related to a particular conversational transaction connection 310. In one embodiment, the conversational transaction message is in the format of an HTTP message. A determination 408 is made whether a conversational transaction message has been received. If not, the servlet 108 continues to wait. If so, the servlet 108 preprocesses the transaction message.

A preprocessor 204 or control module 308 may be used to preprocess 410 the transaction message. Certain transaction messages require data to be sent to the MFS-based IMS application 120 via the MFS adapter 122. For example, a transaction messages comprising a submit request causes input data on a physical page to be sent to the MFS-based IMS application 120 regardless of how much data is in the associated logical page. Other transaction messages may be serviced and responded to directly by the servlet 108. For example, paging requests may be handled directly by the servlet 108 without involving the MFS-based IMS application 120.

In one embodiment, if interaction with the MFS-based IMS application 120 is required, an indicator may be set or another type of condition met. The method 400 may use the indicator to determine 412 whether interaction with the MFS-based IMS application 120 or the host of the MFS-based IMS application (such as for security authentication) is required. Setting the indicator to make this determination 412 depends on many factors including conversation attributes 316, the transaction message type, and the like. If so, the servlet 108 transmits 414 a conversation input message to the MFS-based IMS application 120, preferably by way of the MFS adapter 122.

A conversation input message is a message formatted for use by the MFS adapter 122 in sending input data to the associated MFS-based IMS application 120. Typically, the MFS adapter 122 responds to conversation input messages with conversation output messages. In a preferred embodiment, a MFS adapter 122 configured to allow webservices for B2B transactions is configured to also send and receive conversation messages to and from a servlet 108 implementing the present invention. The MFS adapter 122 serves as a mediator for conversational transactions.

If interaction with the MFS-based IMS application 120 is not required, the state module 306 selectively updates 416 stored conversation attributes 316. Which conversation attributes 316 are updated and how depends on the type of transaction message. Next, the formatter 330 formats 418 and sends the conversational output message to the client 104. In one embodiment, the formatter 330 generates HTML from a subset of XMI data 322 specific to a computing device executing the thin-client 104. The XMI subset 322 may be identified by a modname. The formatter 330 may combine an XMI subset 322 with output data and XSL information to generate the HTML.

Figure 5:
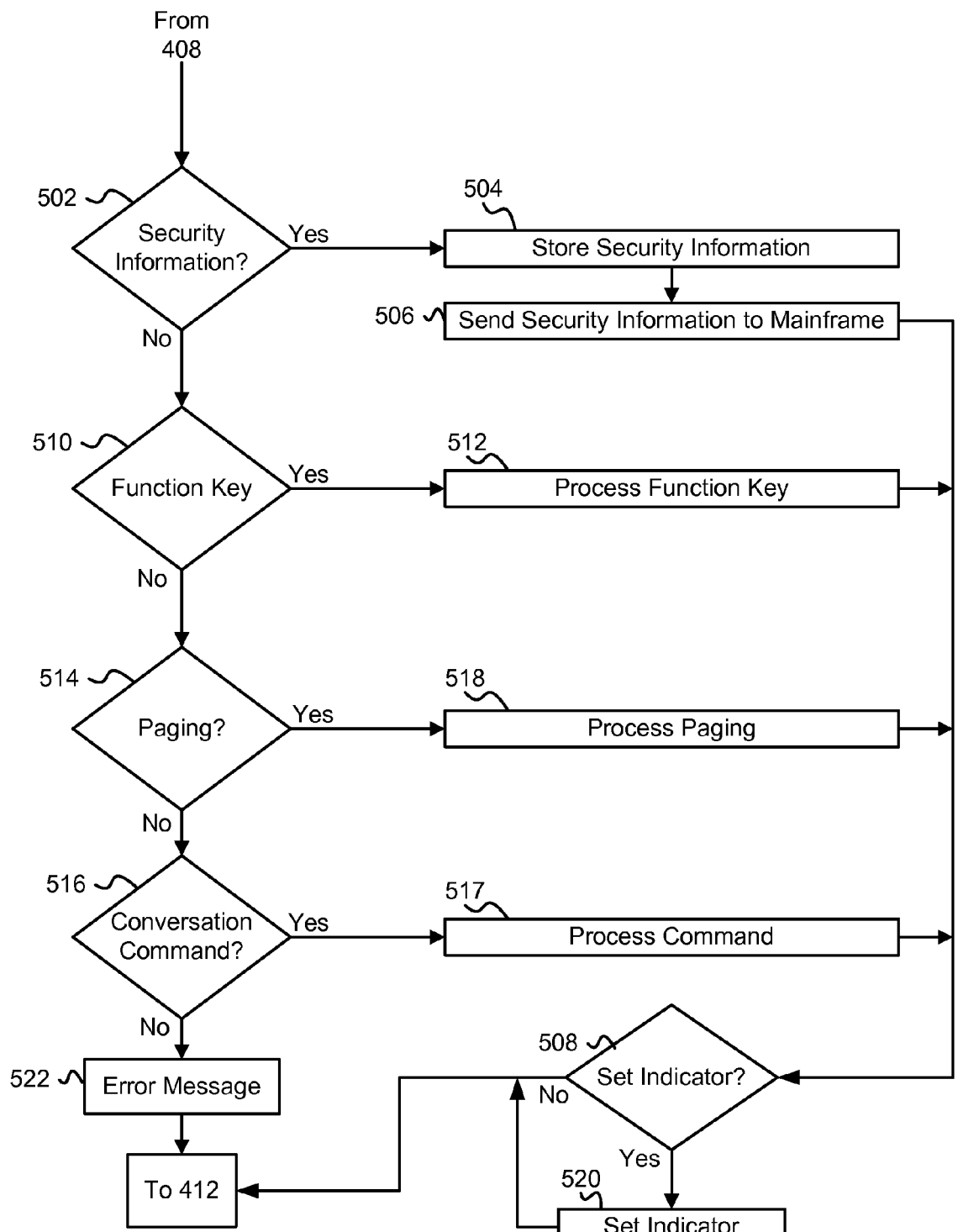
FIG. 5 is a schematic flow chart diagram illustrating one embodiment of a method for preprocessing transaction messages.

FIG. 5 illustrates the preprocessing step 410 within the method 400 of FIG. 4 in more detail. In one embodiment, from the determination step 408, the method 400 determines 502 whether new or updated security credentials/information is provided in the transaction message. If so, the security module 302 stores 504 the security information. In addition, the security module 302 also sends 506 the security information to a mainframe security subsystem such as RACF. Preferably, the MFS-based IMS application 120 is configured to route security information to the appropriate mainframe security subsystem. The security information may be sent together with regular data intended for the MFS-based IMS application 120 in which case the send step 506 may simply comprise the setting of a flag or indicator. For example, the security module 302 may determine 508 whether to set 520 an indicator such that the security information is passed on to the appropriate mainframe security subsystem. Then, the method 400 returns to determination 412.

If the transaction message does not include new or updated security information, a control module 308 may determine 510 if the transaction message was generated by a user activating a function key. If so, the function key module 324 processes 512 the function key as discussed above. Depending on the logic (defined in the XMI 312) associated with a function key, the method determines 508 whether to set the indicator to send data to the MFS adapter 122. For example, one function key may define a literal to add a conversation command to a user supplied modname and then submit the conversation command. If the function key is not supported, the function key module 324 may define a message to be sent to the client 104 indicating that the function key selected is unsupported. Processing 512 the function key may include calling the page module 326 and/or command module 328 to finally determine whether to simply return a result to the client 104 or send information to the MFS adapter 122.

If the transaction message is not associated with a function key, the control module 308 determines 514 whether the transaction message comprises a paging request or a paging command. If so, the page module 326 processes 518 the paging request as discussed above. Processing of a paging request may require transmitting of data to the MFS adapter 122. Page request processing is explained below in relation to FIG. 6. For example, if the user is entering input data on multiple pages of a logical page and the last physical page of the logical page has been input, the control module 308 determines that the indicator should be set. The control module 308 then sets 520 the indicator.

If the transaction message does not comprise a paging request, the control module 308 determines 516 whether the transaction message comprises an conversation command. If not, the control module 308 generates 522 an error message because the transaction message is not understood. If the transaction message is an conversation command, the command module 328 processes 517 the conversation command as discussed above. Once the conversation command is processed, a determination 508 is made whether to send information to the MFS adapter 122. Typically, a conversation command does not involve communication with the MFS adapter 122, unless a conversation is being started or input information has been provided.

In this manner, the method 400 processes a plurality of different transaction message types. Advantageously, all this processing is handled separate from the MFS adapter 122 consequently, the MFS adapter 122 is free to handle more transactions directly related to the MFS-based IMS applications 120 rather than handling client computing device specific needs such as paging, connection management, and the like.

Figure 6:
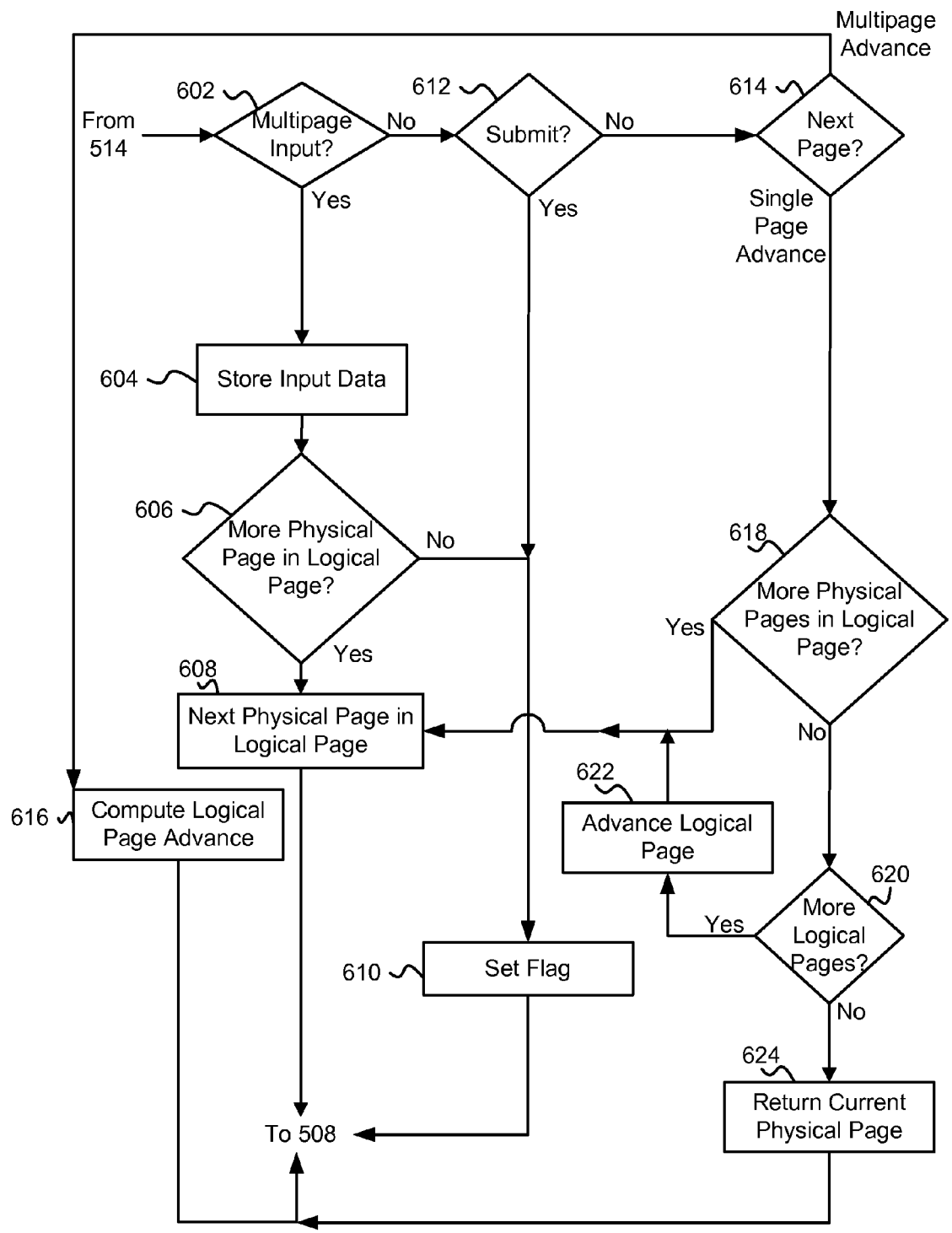
FIG. 6 is a schematic flow chart diagram illustrating one embodiment of a method for processing paging commands.

FIG. 6 illustrates one embodiment of a method 518 for processing paging. Initially, a determination 602 is made whether the transaction message is a collection of data for a physical page that is part of multiple input pages. If so, the page module 326 stores 604 input data provided as part of the transaction message which constitutes a single physical page. The input data may be stored in persistent or non-persistent memory, or storage. Next, a determination 606 is made whether the current logical page includes more physical pages. In other words, the page module 326 answers the question: are there more input pages that the user needs to complete before the whole logical page can be sent to the MFS adapter 122?

If there are more physical pages, the page module 326 cooperates with the formatter 330 to prepare 608 the next physical page. The method then returns to step 508 with no indicator set to interact with the MFS adapter 122. If there are no more physical pages in the logical page, the page module 326 may set 610 a flag indicating that a logical page is to be sent to the MFS adapter 122. The method then returns to step 508 which sets the indicator based on the flag.

If the transaction message is not multipage input, the control module 308 determines 614 whether the transaction message includes a submit command. Typically, a user completes one page of input data and then activates a submit button to send the input data to the MFS-based IMS application 120, unless the input data is multipage input. As described above, if the input is multipage input, the user may complete one physical page and then activate the submit button (user input is cached) or the next page button to move to the next physical input page. Alternatively, if the input is multipage input a next page button may include movement to the next physical input page as well as caching of the recent input page. With a single input physical page, the user activates the submit button which causes the page module 326 to set 610 a flag indicating that a logical page is to be sent to the MFS adapter 122. The logical page need not be completely full before being sent to the MFS adapter 122.

If the transaction message does not include a submit command, the control module 308 determines 614 whether the transaction message includes a next page command. Typically, a next page command is activated when a user is paging through multiple physical output pages of a single logical page. The next page command may comprise a single page advance or a multipage advance operation. If the next page command is a multipage advance operation, the page module 326 computes 616 how many pages are to be advanced and then advances the determined number of pages. In this case, the flag is not set and no information is sent to the MFS adapter 122.

The multipage advance may advance N physical pages, N logical pages, or a combination of these. It should be noted that page advances are typically forward from a first page toward a last page. However, page advances (multiple and single) may also include movement of pages from the last page toward the first page. Typically, the page module 326 advances pages by locating the XMI subset 322 for a desired page and the page information from a page buffer or cache in the apparatus 300. The page information and XMI information is then provided to the formatter 330 which renders the desired page.

If the next page command is a single page advance, either forward or backward, the page module 326 determines 618 whether the current logical page includes more physical pages. If so, the page module 326 cooperates with the formatter 330 to prepare 608 the next physical page. If not, the page module 326 determines 620 whether there are more logical pages. If so, the page module 326 advances 622 to the next logical page and then prepare 608 the next physical page of the advanced logical page. If there are no more logical pages, the page module 326 may simply return 624 the current physical page. Alternatively, the page module 326 may loop around and return the first physical page of the first logical page. Next, the method returns to step 508.

Figure 7:
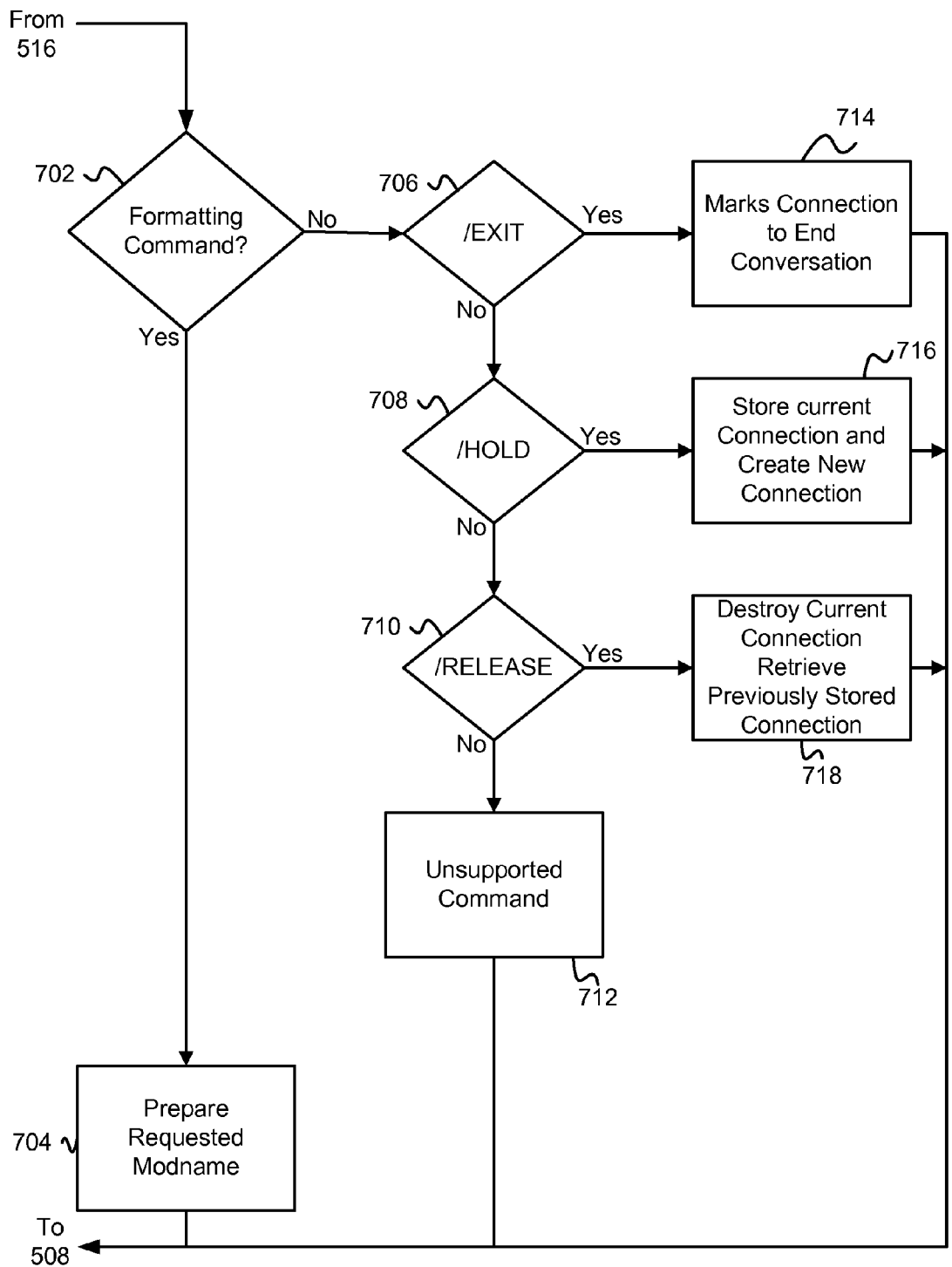
FIG. 7 is a schematic flow chart diagram illustrating one embodiment of a method for processing conversation commands.

FIG. 7 illustrates one embodiment of a method 517 for processing conversation commands. First, the command module 328 may determine 702 whether the transaction message comprises a formatting command. A formatting command is a type of conversation command that instructs that a specific Message Output Device descriptor (MOD) be formatted for rendering on the computing device operating the client 104. Next, the command module 328 prepares 704 the requested MOD, identified by a modname. Preparation of the modname may include extracting the MOD definition from the XMI 312, 314. The method 400 may then return to step 508 of FIG. 5.

If the transaction message does not comprise a formatting command, the command module 328 makes a series of checks 706, 708, 710 to determine respectively whether the transaction message comprises an "EXIT," "HOLD," or "RELEASE," conversation command. If the transaction message fails to satisfy any of these checks 706, 708, 710, the command module 328 indicates 712 that the command is an unsupported command and in certain embodiments may return an error message to the client 104.

If the command module 328 determines 706 the command is an EXIT command, the command module 328 ends 714 the current conversation. In one embodiment, ending the current conversation may comprise setting a flag shared between the control module 308 and the MFS adapter 122. For example, the command module 328 may set a shared variable of a session data object. Before, processing a transaction, the MFS adapter 122 may check this shared variable. If the shared variable is set, the MFS adapter 122 may initiate suitable steps to terminate the conversation.

If the command module 328 determines 708 the command is a HOLD command, the command module 328 stores 716 sufficient information to preserve the current conversation connection. In one embodiment, the command module 328 may store a connection object having data defining the current conversation connection. The connection object may include host name, client ID, security information, the last transaction message, and the like. The command module 328 also creates a new conversation connection for use by the client 104. In certain embodiments, this may comprise defining and initializing a new connection object.

If the command module 328 determines 710 the command is a RELEASE command, the command module 328 destroys 718 the current conversation connection. In one embodiment, the command module 328 may deallocate memory for the current conversation connection object having data defining the current conversation connection. The command module 328 may then retrieve 718 a previously created conversation connection for use by the client 104. In certain embodiments, this operation may comprise reassigning certain connection software pointers.

FIG. 7 illustrates managing of conversation commands for formatting, maintaining, and controlling conversation connections. Advantageously, the logic may be centralized within the control module 308. In this manner, the MFS adapter 122 can contain more generic logic that permits the MFS adapter 122 to provide both B2B and B2C services. The present invention manages input, out, and formatting requirements for a plurality of thin-clients 104 operating on a variety of computing devices.

In summary, the present invention provides a system, method, and apparatus which facilitates conversational transactions between thin-client software and MFS-based IMS applications. The conversational transactions are managed for a plurality of MFS-based IMS applications by a central system, method, or apparatus. The system, method, and apparatus manage paging requests made by a user and format output based on progress of a user through physical pages of one or more logical pages for an MFS-based IMS application. In addition, the present invention provides a logical location for translating messages between the thin-client and more general purpose middleware such as an MFS adapter such that the MFS adapter does not include the overhead of client-specific input and output formatting logic.

Many of the functional units described in this specification have been labeled as components, in order to more particularly emphasize their implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices or the like.

Components may also be implemented in software for execution by various types of processors. An identified component of executable code may, for instance, comprise one or more physical or logical blocks of computer instructions which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software components, user selections, network transactions, database queries, database structures, hardware components, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A programmed method for facilitating transactions between thin-clients and Message Format Service (MFS)-based Information Management System (IMS) applications, the programmed method comprising the process steps of:
   storing, by use of a processor, conversation attributes associated with a conversational transaction between a thin-client and an MFS-based IMS application, the conversation attributes comprising a message input descriptor (MID), a message output descriptor (MOD), and a table;
   establishing a connection for the conversational transaction between the MFS-based IMS application on a mainframe and a web server;
   determining if a request from the thin-client requires interaction with the MFS-based IMS application based on a transaction message type, wherein security information message types, function key message types, paging message types, conversational commands, and format command message types do not require interaction with the MFS-based IMS application;
   in response to the request requiring interaction with the MFS-based IMS application, transmitting a conversation input message to the MFS-based IMS application and formatting a conversation output message for the thin-client from the MFS-based IMS application according to the conversation attributes, wherein formatting comprises combining (XML) Extended Markup Language Metadata Interchange (XMI) information for a computing device executing the thin-client with XML Stylesheet (XSL) information to generate HyperText Markup Language (HTML) data suitable for display on the thin-client and sends the HTML data to the thin-client; and
   in response to the request not requiring interaction with the MFS-based IMS application, responding to the request from the web server.

2. The programmed method of claim 1 further comprising selectively transmitting the conversation input message to the MFS-based IMS application based on a transaction message type and the conversation attributes.

3. The programmed method of claim 2 wherein the conversation input message is transmitted through an MFS adapter that mediates conversational transactions and the conversation output message is received from the MFS adapter.

4. The programmed method of claim 1 wherein the XMI information is associated with the MFS-based IMS application and the XSL information is user configurable.

5. The programmed method of claim 1, the process steps further comprise:
   preprocessing one or more transaction messages from the thin-client based on a transaction message type; and updating the stored conversation attributes in response to a change in the conversation attributes caused by the one or more transaction messages, wherein the one or more transaction messages comprise a conversation command and preprocessing comprises selectively modifying connection information in response to the conversation command.

6. The programmed method of claim 5 wherein the one or more transaction messages comprise a paging command and preprocessing comprises selectively modifying the conversation output message based on pagination information associated with conversation-specific information.

7. A non-transitory computer-readable storage medium tangibly storing computer instructions for facilitating transactions between thin-clients and Message Format Service (MFS)-based Information Management System (IMS) applications, wherein the computer instructions when executed by a computer perform the process steps of:

storing conversation attributes associated with a conversational transaction between a thin-client and an MFS-based IMS application, the conversation attributes comprising a message input descriptor (MID), a message output descriptor (MOD), and a table;

establishing a connection for the conversational transaction between the MFS-based IMS application on a mainframe and a web server;

determining if a request from the thin-client requires interaction with the MFS-based IMS application based on a transaction message type, wherein security information message types, function key message types, paging message types, conversational commands, and format command message types do not require interaction with the MFS-based IMS application;

in response to the request requiring interaction with the MFS-based IMS application, transmitting a conversation input message to the MFS-based IMS application and formatting a conversation output message for the thin-client from the MFS-based IMS application according to the conversation attributes, wherein formatting comprises combining (XML) Extended Markup Language Metadata Interchange (XMI) information for a computing device executing the thin-client with XML Stylesheet (XSL) information to generate HyperText Markup Language (HTML) data suitable for display on the thin-client and sends the HTML data to the thin-client; and in response to the request not requiring interaction with the MFS-based IMS application, responding to the request from the web server.

8. The computer-readable storage medium of claim 7 wherein the process steps further comprising selectively transmitting the conversation input message to the MFS-based IMS application based on a transaction message type and the conversation attributes.

9. The computer-readable storage medium of claim 8 wherein the conversation input message is transmitted through an MFS adapter that mediates conversational transactions and the conversation output message is received from the MFS adapter.

10. The computer-readable storage medium of claim 7 wherein the XMI information is associated with the MFS-based IMS application and the XSL information is user configurable.

11. The computer-readable storage medium of claim 7, the process steps further comprising:

preprocessing one or more transaction messages from the thin-client based on a transaction message type; and updating the stored conversation attributes in response to a change in the conversation attributes caused by the one or more transaction messages, wherein the one or more transaction messages comprise a conversation command and preprocessing comprises selectively modifying connection information in response to the conversation command.

12. The computer-readable storage medium of claim 11 wherein the one or more transaction messages comprise a paging command and preprocessing comprises selectively modifying the conversation output message based on pagination information associated with conversation-specific information.

* * * * *